(12) United States Patent
Baccouche et al.

(10) Patent No.: US 7,762,619 B2
(45) Date of Patent: Jul. 27, 2010

(54) SEQUENTIAL CRASH HINGES IN AUTOMOTIVE FRAME RAILS

(75) Inventors: Mohamed Ridha Baccouche, Ann Arbor, MI (US); Michael Azzouz, Livonia, MI (US); Timothy A. Mouch, Troy, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 29 days.

(21) Appl. No.: 12/182,037

(22) Filed: Jul. 29, 2008

(65) Prior Publication Data

US 2010/0026047 A1 Feb. 4, 2010

(51) Int. Cl.
B62D 25/08 (2006.01)
(52) U.S. Cl. .............. 296/187.09; 296/193.09; 296/203.02; 296/204
(58) Field of Classification Search ............ 296/187.09, 296/187.1, 187.12, 193.09, 203.02, 205, 296/187.03, 204; 180/312
See application file for complete search history.

(56) References Cited

U.S. PATENT DOCUMENTS

| | | | | |
|---|---|---|---|---|
| 3,794,348 A | | 2/1974 | Fischer | 280/106 |
| 5,372,216 A | * | 12/1994 | Tsuji et al. | 180/274 |
| 5,431,445 A | * | 7/1995 | Wheatley | 280/784 |
| 6,152,521 A | * | 11/2000 | Hayashi et al. | 296/187.09 |
| 6,203,098 B1 | * | 3/2001 | Motozawa et al. | 296/187.09 |
| 6,511,119 B2 | * | 1/2003 | Takase et al. | 296/187.09 |
| 6,695,393 B1 | * | 2/2004 | Aouadi et al. | 296/187.09 |
| 6,736,448 B2 | * | 5/2004 | Hanakawa et al. | 296/187.09 |
| 6,880,663 B2 | * | 4/2005 | Fujiki et al. | 180/232 |
| 6,938,948 B1 | * | 9/2005 | Cornell et al. | 296/187.09 |
| 7,226,121 B2 | * | 6/2007 | Dandekar et al. | 296/204 |
| 7,341,299 B1 | * | 3/2008 | Baccouche et al. | 296/30 |
| 7,520,514 B2 | * | 4/2009 | Ogawa et al. | 280/124.109 |
| 7,578,545 B2 | * | 8/2009 | Fujikawa | 296/187.09 |
| 2003/0209380 A1 | * | 11/2003 | Anzai et al. | 180/312 |

* cited by examiner

Primary Examiner—Glenn Dayoan
Assistant Examiner—Gregory Blankenship
(74) Attorney, Agent, or Firm—Frederick Owens, Esq.; Miller Law Group, PLLC

(57) ABSTRACT

A lower frame rail member forms a part of an automotive front end structure and incorporates first and second bending hinges to provide sequential and alternating bending of the lower frame rail to manage crash forces in the event of a frontal or offset crash event. The first bending hinge is formed by a structural thinning pocket located on the outboard side of the lower frame rail forwardly of the engine mounting bracket. The second bending hinge is formed by V-necking the inboard side of the lower frame rail rearwardly of the engine mounting bracket. The first bending hinge affects an outboard buckling of the frame rail after the front horn section crushes rearwardly into the lower frame rail to induce an inboard movement thereof, while the second bending hinge affects an inboard buckling of the frame rail to induce an outboard movement thereof rearwardly of the engine mounting bracket.

18 Claims, 3 Drawing Sheets

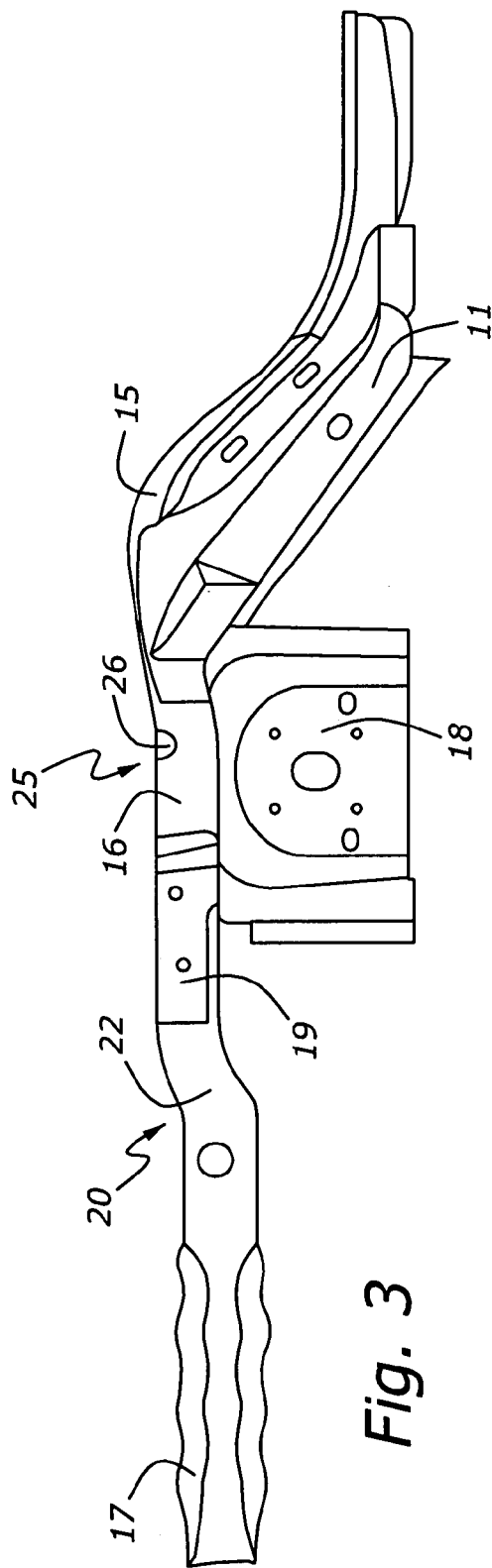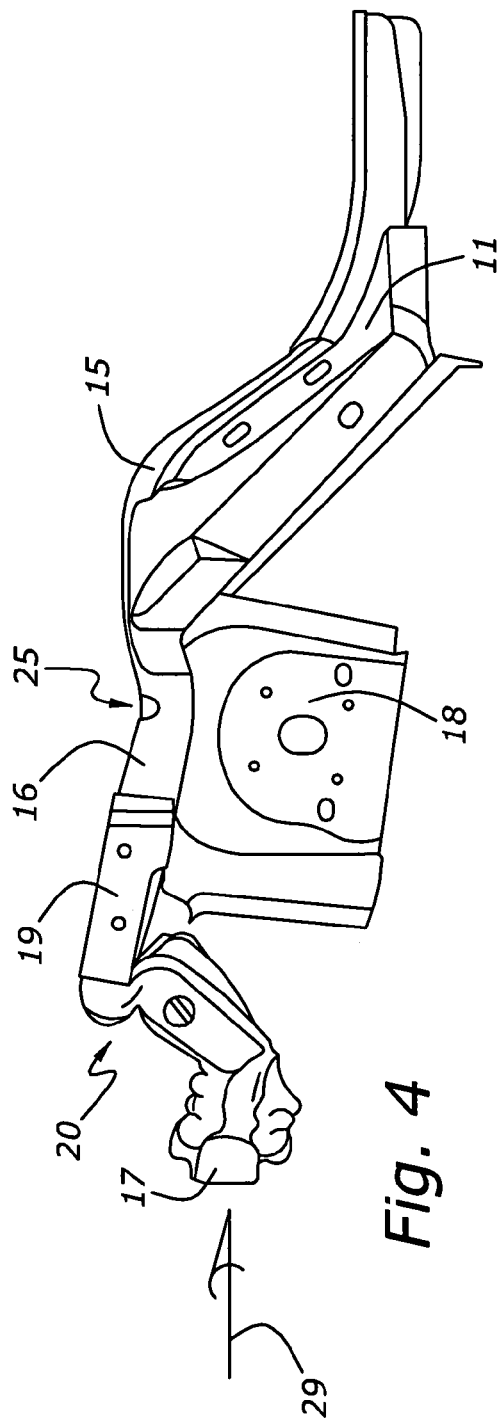

SEQUENTIAL CRASH HINGES IN AUTOMOTIVE FRAME RAILS

FIELD OF THE INVENTION

This invention relates to the frame of an automotive vehicle and, more particularly, to a configuration of a frame rail to manage crash forces by utilizing sequential and alternating bending hinges in the frame rail.

BACKGROUND OF THE INVENTION

The front end structure of an automotive vehicle is designed to provide visual appeal to the vehicle owner while functioning as an energy absorbing structure during frontal and offset crashes. The size, shape and construction of the front end structure contribute to the ability of the front end structure to attenuate the crash pulse and restrict intrusions into the operator's cabin of the vehicle. It is important to design a front end structure to absorb crash energy through the frame components. To that extent, a significant amount of effort by vehicle engineers is devoted to designing the vehicle frame to crush in a controlled manner while absorbing a maximum amount of energy. One of the goals in the design of vehicle frame structure is to provide better engagement and absorption of energy during a collision. The major components in absorbing energy in frontal as well as rear impacts are the frame rails.

Vehicle frames typically include an upper rail and a generally vertically spaced lower rail. Preferably, the upper rail joins the lower rail, such as at the forwardmost portion of the vehicle frame, to define an integrally connected automotive frame structure. The structural joint connection between the vehicular upper and lower structural member is conventionally designed as a solid connection which provided good structural integrity in all directions. One approach to the management of crash energy is to reduce the structural efficiency of the joint between the upper and lower rail members in the fore-and-aft direction to allow a "break away" while experiencing a safety load condition. While effective management of crash energy will include crash triggers in the front end structure, such as the horn connecting the front bumper to the frame rails, and by properly designing the structural joint between the upper and lower rails. The management of crash energy includes the direction and tuning of the load path along which the crash energy is directed. While the formation of the upper and lower rail members is preferably accomplished through hydroforming techniques which forms the upper and lower rails as tubular members, the upper and lower rails can be formed of any material or any construction technique, including stamped and roll-formed vehicular body structures.

The package constraint for the placement and design of the front rail system can present a problem with respect to the energy management function of the front end. In automotive frame configurations in which the package constraint forces the rail to bend downwardly as the horn section approaches the bumper beam, which will allow the automotive frame to meet a 16-20 inch bumper height requirement, a front impact exerts an offset eccentricity between the center of gravity at the bumper and the center of gravity of the subframe attachment. This offset eccentricity can result in a substantial external applied bending at the center of gravity of the front rail section, which can be a large percentage of the bending capacity of the front rail section. Thus, this external applied bending takes away from the section capability to manage the normal buckling and folding stresses due to axial collapse of the horn section of the lower frame rail member. This eccentricity of the frame configuration can result in a premature downward bending of the horn section at the onset of any axial crash.

One approach to resolving this package and loading constraint problem is to reinforce the rearward half or third of the horn section rail length closest to subframe attachment, at lower side of the section where buckling stresses are highest, resulting in a corresponding increase in the bending capacity of the horn section. Typically, this reinforcement is provided in the form of a vertically oriented flange extending downwardly from the horn section. With appropriate structure, the crushability of the horn section can be accomplished effectively to direct the load path for the crash energy into the frame rails.

Mid rail structure is cumbersome due to the various components that are typically attached to the lower frame rails at the crash zones. Subframe, shock tower, engine, transmission in case of rail mounted power train are a few of the components that constrain the controlled crashing of the mid rail structure. The mounting of the engine on the mid-rail structure creates a significant difficulty in managing crash forces. Straight vehicle rails, whether they are parallel to the longitudinal axis of the vehicle or are slightly tapered outboard and/or downward, tend to remain straight because of the higher peak load to induce axial buckling and, therefore, shift the energy management to the backup structure through a bending of the upper and lower elbows of the backup rails. Such frame rail designs do not fully utilize the energy management capability of the mid-rail zones. If triggered correctly, these frame rail designs might be capable of yielding a single bending hinge prior to collapsing the backup structure. The introduction of an engine mounting bracket over the mid-rail zone effectively eliminates any opportunity to manage energy over this mid-rail zone.

U.S. Pat. No. 3,794,348 granted to Hans Fischer et al on Feb. 26, 1974, discloses a frame structure for an automobile that is intended to manage energy in the event of a collision. More specifically, a frame member is made by assembling together four edgewise-abutting longitudinal plates, including a flat upper plate, a flat lower plate and two side plates. The end region of the frame member has interruptions in the welding of both the lower and upper plates to weaken the weld so as to buckle the end region under impact.

The front end subframe structure in U.S. Pat. No. 6,880,663, issued to Hiroyuki Fujiki, et al on Apr. 19, 2005, is used to support a power unit at a support point with a weak section formed on the front side of the support point toward the front of the vehicle so as to be able to bend in case of a frontal impact. U.S. Pat. No. 6,938,948, granted on Sep. 6, 2005, to Troy Cornell, et al discloses a full vehicle frame with a subframe mounted engine where the vehicle frame and the subframe are designed to have crushable junctures that allow the engine cradle to move downwardly and rearwardly in a frontal impact situation.

It would be desirable to provide a frame rail configuration that would enhance the management of crash forces by inducing outboard structural thinning at the mounting of the engine and an inboard material thinning pocket at the end of the engine mounting to affect a first crash hinge in the frame rail and a V-necking at the middle of the frame rail to affect a second sequential bending hinge in a crash mode.

SUMMARY OF THE INVENTION

It is an object of this invention to overcome the aforementioned disadvantages of the known prior art by providing first and second bending hinges in a frame rail at the front end of an automotive vehicle to manage crash forces.

It is another object of this invention to provide sequential and alternating crash hinges in a frame rail in the front end of an automotive vehicle to manage crash forces.

It is a feature of this invention that the first bending hinge is formed as an outboard structural thinning pocket located in the lower frame rail forwardly of the engine mounting bracket.

It is an advantage of this invention that the first bending hinge induces an outboard buckling of the lower frame rail when encountering a frontal or offset crash event.

It is another advantage of this invention that the outboard buckling of the first bending hinge causes an inboard movement of the lower frame rail.

It is another feature of this invention that the horn section crushes rearwardly into the lower frame rail to induce the outward buckling of the lower frame rail.

It is still another feature of this invention that the second bending hinge is formed by a weakening of the lower frame rail through a V-neck located proximate the middle of the lower frame rail.

It is still another advantage of this invention that the second bending hinge induces an inboard buckling of the lower frame rail rearwardly of the engine mounting.

It is yet another advantage of this invention that the second bending hinge causes an outboard movement of the lower frame rail.

It is yet another feature of this invention that the first and second bending hinges are sequentially activated to cause alternative movement of the lower frame rail for effective management of crash forces due to frontal or offset crash events.

It is a further advantage of this invention that the mid-rail structure can manage crash forces despite the placement of various components attached to the central part of the frame rail.

It is a further feature of this invention that the mid-rail structure can manage crash forces while mounting the engine onto the lower frame rail member.

It is yet another object of this invention to provide a frame rail that incorporates bending hinges around an engine mounting bracket, which is durable in construction, inexpensive of manufacture, carefree of maintenance, facile in assemblage, and simple and effective in use.

These and other objects, features and advantages are accomplished according to the instant invention by providing a lower frame rail member forming a part of an automotive front end structure and incorporating first and second bending hinges to provide sequential and alternating bending of the lower frame rail to manage crash forces in the event of a frontal or offset crash event. The first bending hinge is formed by a structural thinning pocket located on the outboard side of the lower frame rail forwardly of the engine mounting bracket. The second bending hinge is formed by V-necking the inboard side of the lower frame rail rearwardly of the engine mounting bracket. The first bending hinge affects an outboard buckling of the frame rail after the front horn section crushes rearwardly into the lower frame rail to induce an inboard movement thereof, while the second bending hinge affects an inboard buckling of the frame rail to induce an outboard movement thereof rearwardly of the engine mounting bracket.

BRIEF DESCRIPTION OF THE DRAWINGS

The advantages of this invention will become apparent upon consideration of the following detailed disclosure of the invention, especially when taken in conjunction with the accompanying drawings wherein:

FIG. 3 is a partial bottom plan view of the lower frame rail as depicted in FIG. 1 prior to sustaining a frontal crash event; and FIG. 4 is a partial bottom plan view of the lower frame rail as shown in FIG. 3, but after sustaining a frontal crash event to depict the operation of the instant invention to manage crash forces.

DETAILED DESCRIPTION OF THE PREFERRED EMBODIMENT

Figure 1:
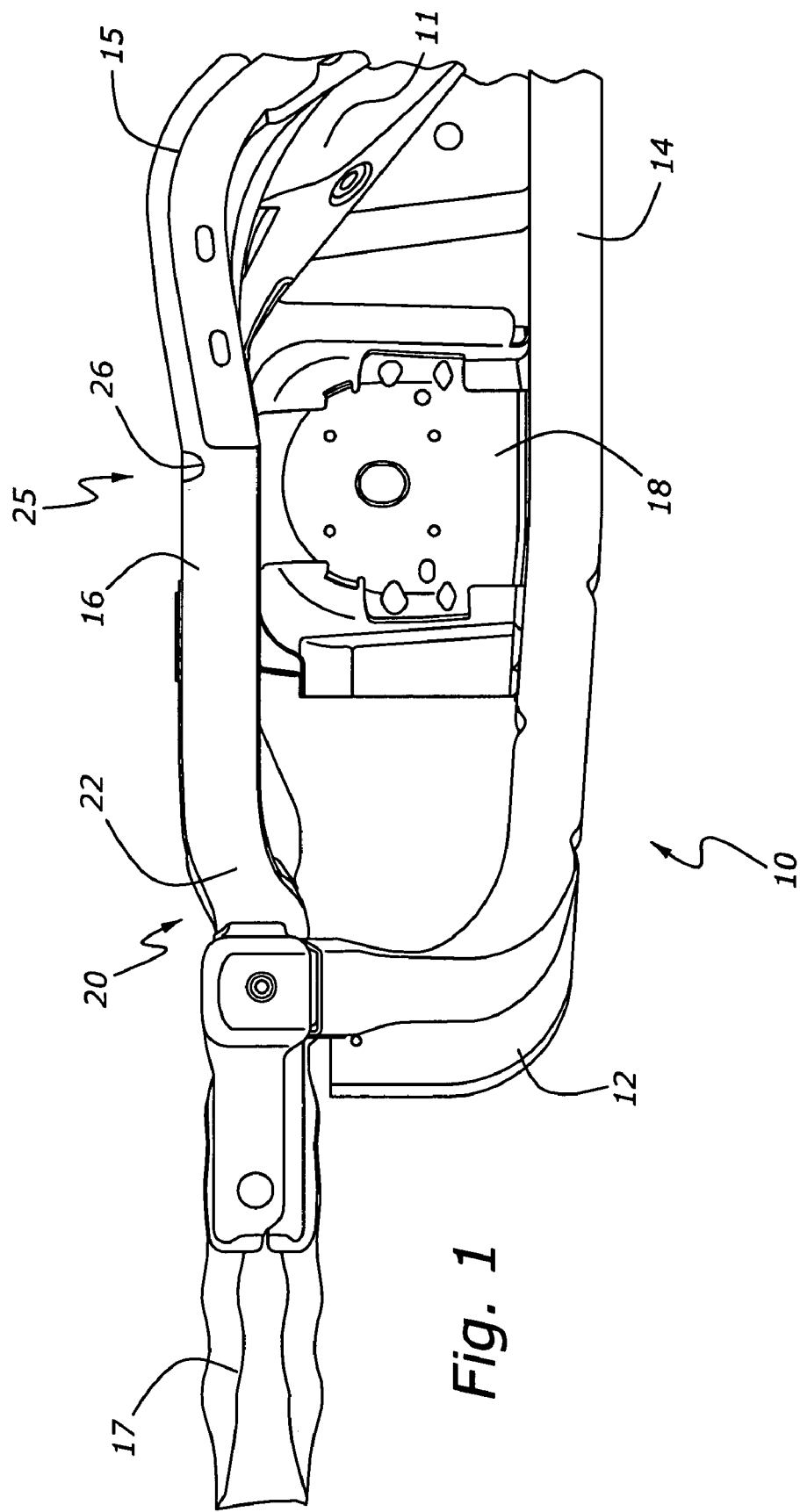
FIG. 1 is a partial bottom plan view of an automotive front end structure depicting the frame rails corresponding to the right side of the vehicle, the lower frame rail incorporating the principles of the instant invention.

Referring to the drawings, a frame structure for the front end of an automotive vehicle incorporating the principles of the instant invention can best be seen. The drawings only depict the frame rails corresponding to one side, e.g. the right side, of the automotive vehicle; however, one skilled in the art will recognize that the opposing side of the automotive front end is also provided with identical, mirror image frame rail structure. Additional details of the front end frame structure can be found in U.S. Pat. No. 7,267,394, granted to Tim Mouch, et al on Sep. 11, 2007, the contents of which are incorporated herein by reference. One skilled in the art will understand that the front end of the automotive vehicle will typically include the engine, transmission, power train, and suspension components, all of which are ultimately supported on the front end frame rails. Furthermore, the passenger compartment is typically located immediately rearwardly of the front end structure and the front end structure can function to manage the impact forces encountered in a front or offset crash event in an attempt to keep the forces directed away from the passenger compartment.

Figure 2:
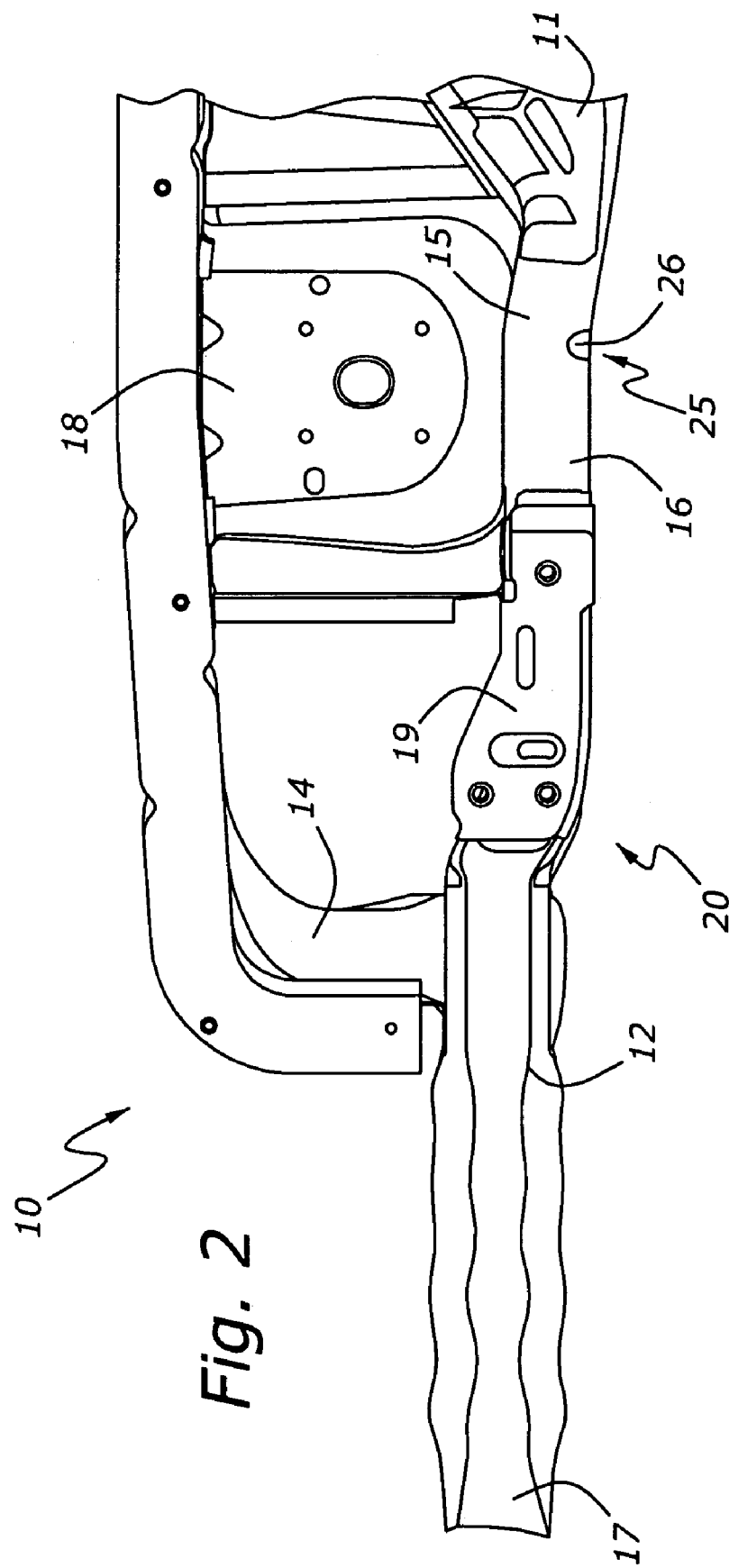
FIG. 2 is a partial top plan view of the automotive front end structure shown in FIG. 1.

The front end 10 of the automotive vehicle depicted in FIGS. 1 and 2 includes an upper frame rail 12, a shock tower support rail 14 and a lower frame rail 15, all of which extend generally longitudinally from a vertical frame member commonly referred to as the A-pillar and terminate in a front bumper. In the front end configuration depicted in FIGS. 1 and 2, the upper frame rail 12 and the shock tower support rail 14 are positioned outboard of the lower frame rail 15. Preferably, each of these frame components 12, 14 and 15 are formed through a hydroforming process in which a standard tubular stock member is placed into a form shaped to correspond to the particular frame member to be formed and to correspond to the particular section required for the frame design. A liquid is then introduced into the interior of the tubular stock and pressurized until the tubular stock expands to assume the shape defined by the configured form. The expanded and re-shaped tubular stock now has a substantially different shape. By forming cutouts and other access openings into the re-shaped tubular member, spot-welding electrodes can gain access to opposing adjacent sides to create a weld bond between juxtaposed members. In this manner, a frame, as an example, for an automobile can be created using in large part hydroformed tubular members, particularly for components like frame rail members.

The lower frame rail 15 terminates in a horn section 16 that extends longitudinally to support a front bumper (not shown). The horn section 17 is preferably formed with crash triggers that define a convoluted shape subjected to being crushed or collapsed at the crash triggers when the bumper encounters an impact force. Thus, the horn section 17 starts the management of the crash forces encountered in a frontal or offset crash event by collapsing in a prescribed manner as the bumper is pushed rearwardly from the impact forces. The lower frame rail 15 is positioned lower than the majority of the upper frame rail 12 and shock tower support rail 14 structures, although both the upper frame rail 12 and the shock tower frame rail 14 bend downwardly at the forward end thereof to connect to the lower frame rail, as is shown and described in the aforementioned U.S. Pat. No. 7,267,394. The lower frame rail 15 also supports the shock tower pan 18 and an engine mounting bracket 19. The placement of the engine mounting bracket 19 on the lower frame rail 15 serves to reinforce the lower frame rail 15 and, thus, restricts the ability of the lower frame rail 15 to bend, collapse or otherwise manage impact crash forces.

To enable the lower frame rail 15 to manage impact crash forces, the lower frame rail 15 is provided with first and second bending hinges 20, 25, respectively, to induce the lower frame rail 15 to bend in a predefined manner when impact crash forces are encountered. The first bending hinge 20 is formed as a structural thinning pocket 22 of the section of the lower frame rail 15. This structural thinning pocket 22 is best seen in FIGS. 1 and 3, and consists of a bend in the lower frame rail 15 and a reduction in the cross-section of the lower frame rail 15. The purpose of the first bending hinge 20 is to induce the lower frame rail 15 to buckle at the structural thinning pocket 22 in an outboard direction, which in turn causes the mid-portion 16 of the lower frame rail 15 to bend in the inboard direction, as is depicted in FIG. 4.

The second bending hinge 25 is formed rearwardly of the engine mounting bracket 19 as a V-neck 26 thinning of the material on the inboard side of the lower frame rail 15 to create a weakened position on the inboard side of the lower frame rail 15. This weakening of the lower frame rail 15, induces the mid-portion 16 of the lower frame rail 15 to buckle in an inboard direction, which results in a lateral outboard movement of the mid-rail portion 16 of the lower frame rail 15. As can be seen in FIGS. 1 and 3, the location of the first bending hinge 20 is immediately forward of the engine mounting bracket 19 to induce a bending movement into the lower frame rail forwardly of the reinforcement provided by the attached engine mounting bracket 19. The second bending hinge 25 is located rearwardly of the engine mounting bracket 19 at the central portion of the lower frame rail. The lower frame rail member 15 is typically associated with a back-up reinforcement structure 11. The preferred location of the second bending hinge 25 is at a position forwardly of the back-up reinforcement member 11 so that the induced bending of the lower frame rail 15 will be between the brackets 11, 19 that serve to reinforce the structure of the lower frame rail 15.

The operation of the crash management system incorporated into the lower frame rail 15 can best be seen in FIG. 4 in which the lower frame 15 has been subjected to a frontal crash event, represented by the arrow 29. The result of the application of the impact crash forces 29 is that the horn section 17 collapses first in a generally rearwardly direction into the lower frame rail 15. Since the structural thinning pocket 22 of the lower frame rail 15 creates an offset in the overall physical shape of the lower frame rail 15, the rearwardly collapsing horn section 17 directs the crash forces into the lower frame rail member 15 along a line that is offset from the center line of the mid-rail portion 16. This first bending hinge 20 causes the lower frame rail 15 to buckle in the outboard direction to cause the lower frame rail 15 to deflect inwardly. The first bending hinge 20 affects the buckling of the lower frame rail 15 forwardly of the reinforcement provided through the engine mounting bracket 19.

If additional crash forces are being transmitted rearwardly, the second bending hinge 25 causes a second buckling of the lower frame rail 15 in the opposite direction of the first bending hinge 20 to affect a buckling movement in an inboard direction, resulting in an outboard deflection of the mid-rail portion 16 of the lower frame rail 15. The location of the second bending hinge 25 rearward of the reinforcement provided by the engine mounting bracket 19 allows the lower frame rail 15 to be buckled in opposite directions to effectively manage crash forces resulting from a frontal or offset crash event before reaching the back-up reinforcement 11 at the rearward end of the lower frame rail 15. The sequential and alternating bending hinges creates a Z-bending mode for the lower frame rail 15 despite the presence of the reinforcement provided by the attachment of the engine mounting bracket 19 to the lower frame rail 15.

The formation of the first and second bending hinges 20, 25 as described above is particularly adapted to being formed in the lower frame rail 15 through the hydroforming process. By shaping the die to provide a smaller structural cross-section at the pocket 22 and the curved shape that defines the offset nature of the first bending hinge 20, and defining a V-neck cutout along the vertical side of the mid-rail portion 16, the first and second bending hinges 20, 25 will be formed with the hydroforming of the lower frame rail 15.

One skilled in the art will recognize that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention.

Having thus described the invention, what is claimed is:

1. In a front end structure of an automotive vehicle body having a pair of generally longitudinally extending, transversely spaced upper frame rails and a pair of generally longitudinally extending, transversely spaced lower frame rail, the improvement comprising:

each of the lower frame rails are formed with a first bending hinge located in a forward portion of the lower frame rail to affect lateral movement of the lower frame rail in a first direction when rearwardly directed crash forces are encountered by the lower frame rail, and a second bending hinge located rearwardly of the first bending hinge to affect a lateral movement of the lower frame rail in a second direction opposite the first direction when the rearwardly directed crash forces are encountered, the lower frame rail having an engine mounting bracket attached thereto, the first bending hinge being located forwardly of the engine mounting bracket.

2. The front end structure of claim 1 wherein the first bending hinge is formed as a structural reduction in the cross-section of the lower frame rail.

3. The front end structure of claim 2 wherein the first bending hinge also includes a bend in the structure of the lower frame rail such that the center of the lower frame rail forwardly of the first bending hinge is transversely offset from the center of the lower frame rail rearwardly of the first bending hinge.

4. The front end structure of claim 1 wherein the second bending hinge is formed as a reduction of material at the second bending hinge, the second bending hinge being located rearwardly of the engine mounting bracket.

5. The front end structure of claim 4 wherein the first bending hinge causes a buckling of an outboard portion of the lower frame rail to cause an inboard deflection of the lower frame rail.

6. The front end structure of claim 5 wherein the second bending hinge causes a buckling of an inboard portion of the lower frame rail to cause an outboard deflection of the lower frame rail.

7. The front end structure of claim 6 further comprising a back-up reinforcement member associated with a rearward end of the lower frame rail, the first and second bending hinges being located forwardly of the back-up reinforcement member.

8. A tubular lower frame rail member for an automotive vehicle, said lower frame rail having an inboard side and an outboard side, comprising:
 a forward end portion;
 a rearward end portion;
 a mid-rail portion extending between the forward end portion and the rearward end portion;
 a first crash hinge located between the forward end portion and the mid-rail portion to affect lateral movement of the mid-rail portion in an outboard direction when rearwardly directed crash forces are encountered by the lower frame rail, the first crash hinge being formed as a bend in both the inboard and outboard sides of the lower frame rail such that the center of the forward end portion is transversely offset outboard of the center of the mid-rail portion; and
 a second crash hinge located in the mid-rail portion to affect a lateral movement of the mid-rail portion in an inboard direction when the rearwardly directed crash forces are encountered.

9. The lower frame rail member of claim 8 wherein the first crash hinge is formed as a reduction in the structural cross-section of the lower frame rail.

10. The lower frame rail member of claim 9 wherein an engine mounting bracket is attached to the mid-rail portion between the first and second crash hinges.

11. The lower frame rail member of claim 10 wherein the second crash hinge is formed as a reduction of material of the mid-rail portion.

12. The lower frame rail member of claim 11 wherein the first crash hinge causes a buckling of the outboard side of the lower frame rail to cause an inboard deflection of the mid-rail portion, the second crash hinge causes a buckling of the inboard side of the lower frame rail to cause an outboard deflection of the mid-rail portion.

13. An automotive vehicle front end structure comprising:
 a pair of generally longitudinally extending, transversely spaced upper frame rails; and
 a pair of generally longitudinally extending, transversely spaced lower frame rails, each of the lower frame rails having a forward end portion, a rearward end portion and a mid-rail portion extending between the forward and rearward end portions, each lower frame rail being formed with a first crash hinge located between the forward end portion and the mid-rail portion to affect lateral movement of the mid-rail portion in a first direction when rearwardly directed crash forces are encountered by the lower frame rail, and a second crash hinge located in said mid-rail portion to affect a lateral movement of the mid-rail portion in a second direction opposite the first direction when the rearwardly directed crash forces are encountered, the second crash hinge being formed as a reduction of material in the mid-rail portion.

14. The front end structure of claim 13 wherein the first crash hinge is formed as a reduction in the structural cross-section of the lower frame rail.

15. The front end structure of claim 14 wherein the first crash hinge also includes a bend in the structure of the lower frame rail between the forward end portion and the mid-rail portion such that the center of the forward end portion is offset transversely from the center of the mid-rail portion.

16. The front end structure of claim 15 wherein an engine mounting bracket is attached to the mid-rail portion, the first crash hinge being located forwardly of the engine mounting bracket and the second crash hinge being located rearwardly of the engine mounting bracket.

17. The front end structure of claim 16 wherein the first crash hinge causes a buckling of an outboard portion of the lower frame rail to affect an inboard deflection of the mid-rail portion, the second crash hinge causing a buckling of an inboard portion of the lower frame rail to affect an outboard deflection of the mid-rail portion.

18. The front end structure of claim 17 further comprising a back-up reinforcement member associated with the rearward end portion, the first and second crash hinges being located forwardly of the back-up reinforcement member.

* * * * *